July 31, 1945.  T. O. RUEB  2,380,792
TAPER GAUGE
Filed Feb. 11, 1944   2 Sheets-Sheet 1

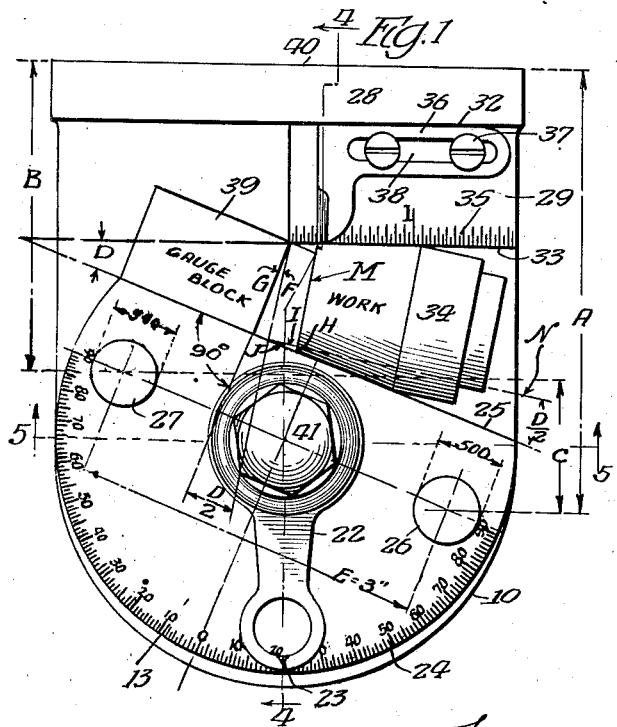

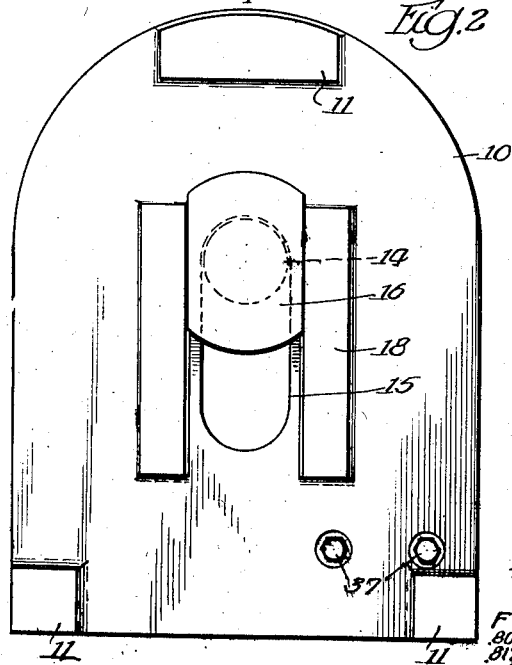

Fig. 7

EXAMPLE

| | |
|---|---|
| $D$ | $= 20° - 24'$ |
| $F$ | $= .807$ |
| $C.$ | $= E \times SINE \cdot D \cdot$ |
| $C.$ | $= 3 \times SINE\ 20°\text{-}24'$ |
| $C.$ | $= 3 \times .34857$ |
| $C.$ | $= 1.04571$ |
| $C.$ | $= A. - B$ |
| $G.$ | $= F \times COSINE\ \frac{D}{2}$ |
| $G.$ | $= F \times COSINE\ 10°\text{-}12'$ |
| $G.$ | $= .807 \times .98419$ |
| $G.$ | $= .79424133$ |
| $I.$ | $= H \times COTANGENT\ \frac{D}{2}$ |
| $I.$ | $= .005 \times 5.5578$ |
| $I.$ | $= .027789$ |
| $J.$ | $= H \times SINE\ \frac{D}{2}$ |
| $J.$ | $= .005 \div SINE\ 10°\text{-}12'$ |
| $J.$ | $= .005 \div .17708$ |
| $J.$ | $= .02823''$ |

Fig. 8
TRIGONOMETRIC ANALYSIS

| | |
|---|---|
| $A - B = C.$ | |
| $(D)$ | $= GIVEN$ |
| $C$ | $= E \times SINE\ (D)$ |
| $G$ | $= F \times COSINE\ \frac{D}{2}$ |
| $I$ | $= H \times COTANGENT\ \frac{D}{2}$ |
| $J$ | $= H \div SINE\ \frac{D}{2}$ |

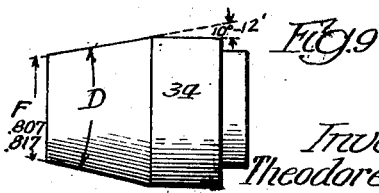

Fig. 9

Inventor
Theodore O. Rueb
By Glenn S. Noble
Atty.

July 31, 1945. T. O. RUEB 2,380,792
TAPER GAUGE
Filed Feb. 11, 1944 2 Sheets-Sheet 2
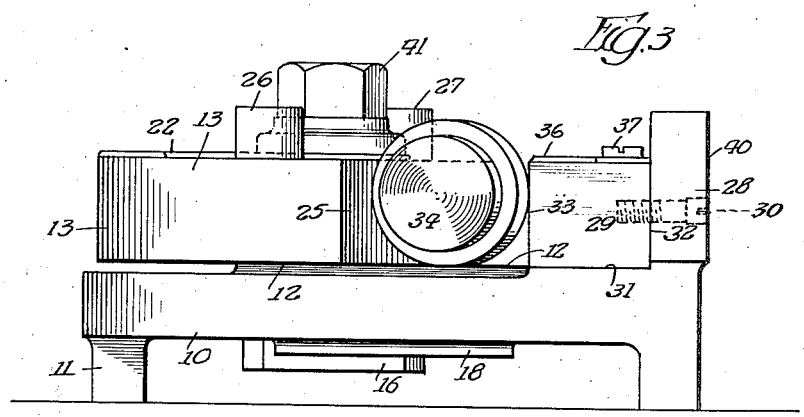
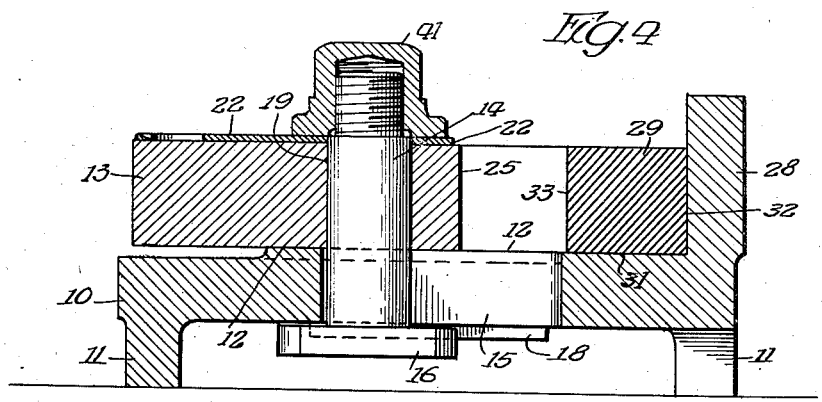
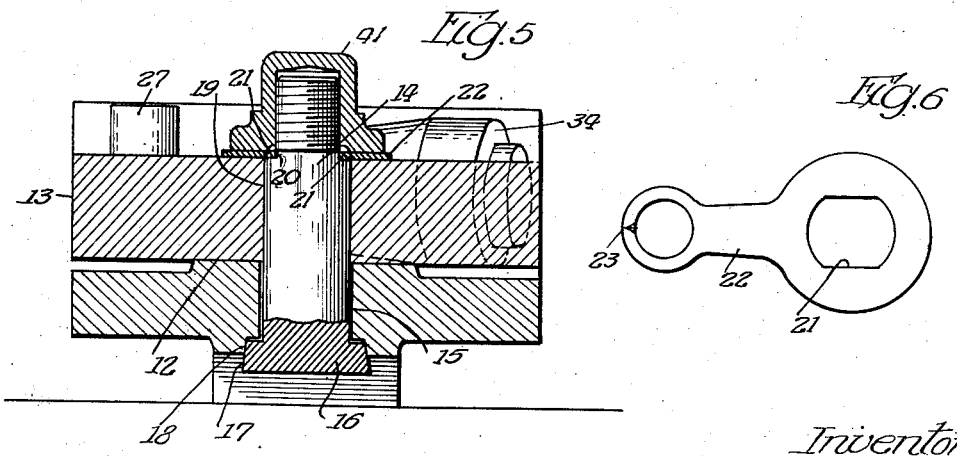
Inventor
Theodore O. Rueb
By Glenn S. Noble
Atty Patented July 31, 1945

2,380,792

UNITED STATES PATENT OFFICE 2,380,792

TAPER GAUGE

Theodore O. Rueb, Chicago, Ill.

Application February 11, 1944, Serial No. 521,981

4 Claims. (Cl. 33—75)

This invention relates to gauges for use in testing or gauging tapered articles such as taper pins, the tapered portions of certain tools or machine elements such as arbors or the like, or other similar devices. Heretofore ring gauges have been more or less commonly used for testing tapered pieces, but such gauges are usually quite difficult to manufacture with the result that they are expensive and each gauge is only adapted for a certain part or taper. In accordance with the present invention, I provide a gauge which is more or less universal in its application or use and is adapted for gauging tapered elements of various lengths and angles.

The objects of this invention are to provide an improved gauge for the purposes indicated which will be of comparatively simple and sturdy construction and which will be durable in use; to provide a gauge for tapered pieces which may be adjusted with great accuracy for testing such pieces of various dimensions; to provide a gauge which may be readily set to indicate tolerance limits; and to provide a gauge or instrument having such further novel features and advantages as will appear more fully hereinafter.

My improved gauge employs some of the principles or features of a sine-bar which is used for the accurate measurement of angles.

In the accompanying drawings illustrating this invention,

Fig. 1 is a plan view showing a work piece in position for testing;

Fig. 2 is a bottom plan view;

Fig. 3 is a side view as seen from the right hand side of Fig. 1;

Fig. 4 is a sectional view taken substantially on the line 4—4 of Fig. 1;

Fig. 5 is a sectional view taken substantially on the line 5—5 of Fig. 1;

Fig. 6 is a detail showing the pointer or finger which coacts with a scale for angular measurement;

Fig. 7 is a chart or table illustrating the use of the gauge;

Fig. 8 is a chart showing the trigonometric analysis of the mathematical problem or measurements involved in the use of the gauge; and Fig. 9 is a detail of a given work piece.

The particular embodiment of the invention shown in these drawings has a substantial base 10 with pads or feet 11 to hold the same above a bench or table. The base has a top accurately finished surface or true bearing 12 on which is adjustably supported a segmental disc or block 13 which has its lower portion accurately finished to engage with the bearing 12. This block is held in adjusted positions by means of a bolt 14 which extends through a longitudinal slot 15 in the base and which has an elongated head 16 with tapered sides 17 that engage with guideway members 18 on the base as shown in Figures 4 and 5. The bolt fits closely in a hole 19 in the segmental disc member 13. Its upper end is flattened on the sides at 20 for engagement with a correspondingly shaped hole 21 in a pointer or finger 22 which is thereby keyed or fastened to the bolt and prevented from turning. The pointer 22 has an indicating or registering mark 23 which coacts with a circular scale 24 on the disc member 13 for measuring angles as will presently be described. The bolt 14 has a nut 41 for fastening the parts together. The disc member 13 which functions closely in the manner of a sine-bar has an accurate face or straight edge 25 which forms one of the gauge elements, and two hardened ground plugs 26 and 27 which are attached to the disc member in any suitable manner. These plugs are of the same diameter and are spaced apart at a predetermined fixed distance as indicated at E, which in the present instance, is assumed as being 3 inches, to facilitate calculations. The edge or face 25 is parallel with the line through the plug centers.

The base or body 10 has an integrally formed upwardly extending wall 28 at the back to which is attached a block 29 as by means of a screw 30. The block 29 is accurately finished on all surfaces and rests on a similarly finished surface 31 on the upper face of the base 10 and against a similarly finished surface 32 on the wall 28, the arrangement being such that this block is rigidly and securely held in position. It may be made of some special steel or alloy and hardened and ground to provide the desired accuracy. The face 33 of this block coacts with the face 25 of the disc member 13 for engagement with the sides of a tapered work piece 34 which is to be gauged as shown in Fig. 1, and is similar to the true surface commonly used in connection with sine-bars. The block 29 has a scale 35 extending from the left-hand end as shown in Fig. 1 for measuring distances from said end. A hand or index finger 36 is adjustably mounted on the block by means of screws 37 which engage with a slot 38 in the hand and is used for indicating predetermined measurements on the scale.

The work piece 34 which may indicate a tapered plug, valve, tool or any other part to be gauged, is usually defined by giving the diameter of the smaller end together with the angle of taper designated in the drawings respectively as F and D. Having such measurements, the user of the gauge first proceeds to determine what the distance should be from the extreme left hand corner of the block 29 to the face 25 when the work piece is in position for gauging as indicated. Such measurement G is found by multiplying the measurement F by one-half of the cosine of the angle D. In order that the use of the instrument may be readily understood, I have shown an example in Fig. 7 and a trigonometric analysis in Fig. 8. In this instance, the measurement F as indicated on the work piece shown in Fig. 9 is .807", with an indicated tolerance of .010", and the angle D 20°—24'. The distance G is determined by multiplying F (.807) by the cosine of ½ of D which is .98419. G would therefore be .79424133. The user then selects a gauge block 39 of accurate dimensions such as a Johanson block having this exact width. A well equipped shop will have all of such blocks necessary, but if the desired block is not at hand, he will then grind a suitable piece of steel to give this exact dimension. This block is then inserted between the face 25 and the corner of the block 29 as shown in Fig. 1 and will provide the desired distance between these points. The disc member 13 is loosened sufficiently to make such adjustment and may be slid along the slot 15 and also adjusted circumferentially so that the desired angle as, for instance, 20°—24' is shown by the hand or pointer 22. The nut is then tightened sufficiently to hold the parts in such adjusted position, but for greater accuracy, the disc member is further adjusted or set by means of a micrometer which is used for measuring the distance from the rear finished face 40 of the wall 28 to the plugs 26 and 27. The measurement C which equals A—B is determined by multiplying E, the distance between the centers of the plugs by the sine with the angle D. In the present instance, this is 3×.34857=1.04571. By using the micrometer, the distance C may be accurately fixed with the face 25 closely engaging the block 39 and the nut 41 is then tightened to securely hold the disc member in adjusted position. The block 39 is then removed, and the gauge is set for gauging the work pieces which are inserted or fitted between the planes or faces 25 and 33 as shown.

However, in order to provide for the allowed tolerance, the index finger 36 is first set at a distance from the end of the block to indicate the position for the larger allowable diameter. This distance is determined by finding the length of the hypotenuse J of the small triangle shown in Fig. 1 which is bounded by the surface 25, the transverse line M indicating the allowed larger diameter, and a line N which is parallel to the center of the work piece and intersects the surface 25 at the line F. The angle between the last named line and the surface will therefore be ½ of the angle D. The sides of the triangle are marked respectively J, H and I as shown. The length of the line H at the small end of the triangle is ½ of the allowed tolerance, or in the present example .005. The length of the line I=H × the cotangent of ½ of the angle D, or in the present example, .005×5.5578. The length of the line J=H ÷ the sine of ½ of the angle D, or in the present instance, .005÷.17708=.02823. Having determined the proper distance from the end of the block 29 for the index finger 36 to be set, it is moved to such position and secured by means of the screws.

With the instrument adjusted and set in the manner disclosed, it is ready for gauging the tapered work pieces which are inserted therein as indicated, and if the small end of the work piece stops at either of the lines F or M or therebetween, it is suitable to be passed, otherwise the piece should be rejected. It will also be apparent that the gauge may be set for gauging or testing other shapes or forms so that it may have more or less universal application.

My improved gauge may be set with the greatest of accuracy for various tapers, or the like, and will serve to gauge different articles without the necessity of separate ring gauges or the like, thus saving much in the way of labor and material.

While I have disclosed a preferred form of the invention, I do not wish to be limited to the exact construction or arrangement herein shown and described except as specified in the following claims.

I claim:

1. A universal gauge comprising a base, a wall extending upwardly from said base, a rectangular block secured in the angle between the wall and the base and having a vertical flat face on the side opposite from the wall, a sine-bar member slidably and rotatably mounted on the base and adapted to slide at right angles to said face, said sine bar having a vertical face opposed to the face on the block and coacting therewith for receiving the work piece and also having two upwardly extending plugs at a predetermined distance apart, said block having one end registering with the center of the base and having a scale for measuring the distance from said end along the face, and an index finger adjustably secured to the block and registering with said scale.

2. In a taper gauge, the combination of a base with an upwardly extending wall at one end thereof and having a slot at right angles to the wall, a bolt extending through the slot and having an elongated head with tapered sides engaging with guideway members on the lower side of the base, a segmental disc member rotatably mounted on the bolt and fitting on the upper surface of the block, a pointer secured to the bolt, an angle scale on the disc member which coacts with the pointer for indicating the angular position of said member, a nut for holding the bolt and parts in adjusted positions, said disc member having a straight edge forming one side thereof, two plugs extending upwardly from the disc member on either side of the center thereof and at a predetermined distance apart, said plugs being adapted to be used for measuring the distances from the back of the wall to the respective plugs for fixing the angular position of the disc member, a rectangular block secured to the base with one end on the center line thereof and in alignment with the center of the slot, said block having a face which coacts with the opposed straight edge on the disc member for receiving the piece to be gauged, and a scale for indicating the distance from the end of the block for use in defining one position of the work piece in accordance with the tolerance to be allowed.

3. In a taper gauge, the combination of a base, a sine-bar member slidably and rotatably mounted on the base and having a true face along one side thereof, a block on the base having one corner on the center line of the base and having a face at right angles to the center line of the base, said sine-bar member being adapted to coact with a gauge block selected by computation for determining the distance between the true face of the sine-bar member and the corner of the block for a work piece having a given diameter and taper, and means for measuring the position of the true face of the sine-bar member with respect to the face of the block to give the desired angle for measuring the taper of the work piece, substantially as described.

4. In a taper gauge, the combination of a base having a true top surface and having an upwardly extending wall at one end thereof, said base having a longitudinal slot at right angles to the wall and having guideways parallel to the slot, a bolt extending upwardly through the slot and having a head with tapered sides for engagement with the guideways, a segmental disc member rotatably mounted on the bolt and fitting closely against the upper surface of the base and having a flat side providing a straight edge, an index finger secured to the bolt above the disc member, a scale on the disc member coacting with said finger for indicating the angular position of said member, a nut on the bolt for holding the parts securely in adjusted positions, said disc member having two upwardly extending plugs at a predetermined distance apart which are adapted to be used for setting the angular position of the disc member with respect to the wall on the base, a hardened and ground rectangular block fitting in the angle between the wall and the base and terminating at the center of the base, one corner of the block being in alignment with the center of the slot, said block having a face opposed to the straight edge of the disc member, a scale for indicating distances from the end of the block along said face adapted to be used for indicating tolerance positions, an index finger coacting with the scale, means for holding the finger in adjusted positions, said disk member and block being adapted to coact with a gauge block adapted to be fitted between the straight edge and the corner of the block for properly positioning the straight edge for a tapered work piece of predetermined dimensions, which work piece may be positioned between the straight edge and the face of the block for determining the accuracy of the finish of said work piece.

THEODORE O. RUEB.